United States Patent
Wang et al.

(10) Patent No.: US 12,402,981 B1
(45) Date of Patent: Sep. 2, 2025

(54) PROPHY ANGLE WITH SPLATTER GUARD

(71) Applicant: Pac-Dent, Inc., Brea, CA (US)

(72) Inventors: Daniel Wang, Brea, CA (US); Chunyu Wang, Brea, CA (US); Jian Li, Suzhou (CN)

(73) Assignee: Pac-Dent, Inc., Brea, CA (US)

( * ) Notice: Subject to any disclaimer, the term of this patent is extended or adjusted under 35 U.S.C. 154(b) by 0 days.

(21) Appl. No.: 19/198,446

(22) Filed: May 5, 2025

Related U.S. Application Data

(63) Continuation of application No. 18/885,528, filed on Sep. 13, 2024, now Pat. No. 12,318,259.

(60) Provisional application No. 63/538,464, filed on Sep. 14, 2023.

(51) Int. Cl.
*A61C 1/12* (2006.01)
*A61C 17/00* (2006.01)
*A61C 17/22* (2006.01)

(52) U.S. Cl.
CPC .............. *A61C 1/12* (2013.01); *A61C 17/005* (2013.01); *A61C 17/22* (2013.01)

(58) Field of Classification Search
CPC ......... A61C 17/005; A61C 17/22; A61C 1/12; A61C 1/16
See application file for complete search history.

(56) References Cited

U.S. PATENT DOCUMENTS

| | | | |
|---|---|---|---|
| 2,943,343 A * | 7/1960 | Jankelson | A61C 17/005 D24/146 |
| 4,424,036 A | 1/1984 | Lokken | |
| 5,131,846 A * | 7/1992 | Hall | A61C 17/005 433/116 |
| 8,784,102 B1 | 7/2014 | Kumar | |
| 9,962,236 B1 | 5/2018 | Kumar | |
| 2007/0026361 A1 | 2/2007 | Carron | |
| 2007/0136965 A1* | 6/2007 | Ukaj | A61C 17/005 15/28 |
| 2014/0141386 A1 | 5/2014 | Madry | |
| 2016/0361136 A1* | 12/2016 | Carron | A61C 1/141 |
| 2018/0256301 A1* | 9/2018 | McLean | A61C 17/005 |
| 2020/0390532 A1* | 12/2020 | Racine | A61C 17/0208 |

* cited by examiner

*Primary Examiner* — Thomas C Barrett
*Assistant Examiner* — Shannel Nicole Belk
(74) *Attorney, Agent, or Firm* — Crockett & Crockett, PC; K. David Crockett, Esq.

(57) ABSTRACT

A prophy angle with a splatter guard. The splatter guard is provided in the form of a partial cylinder extending along the side of the prophy cup.

10 Claims, 3 Drawing Sheets

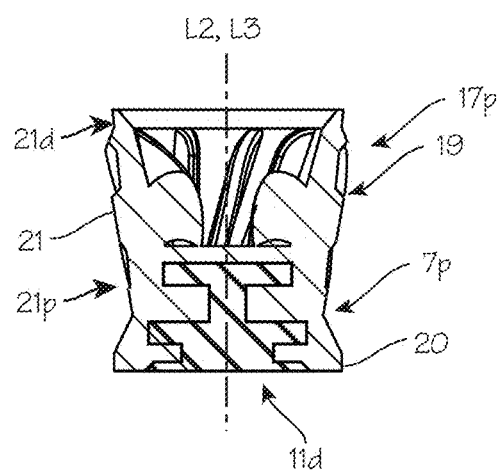
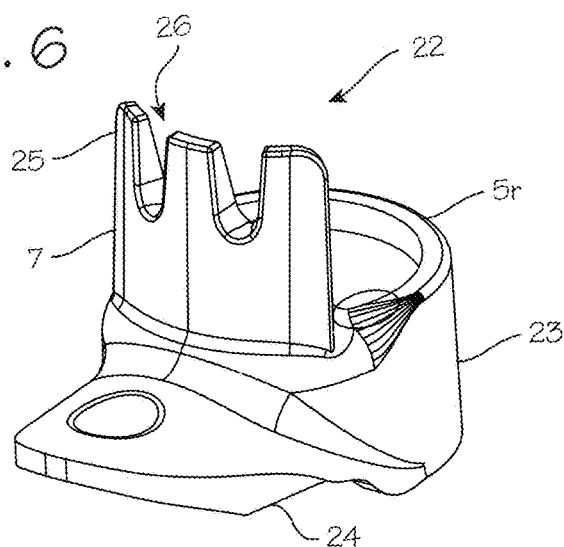
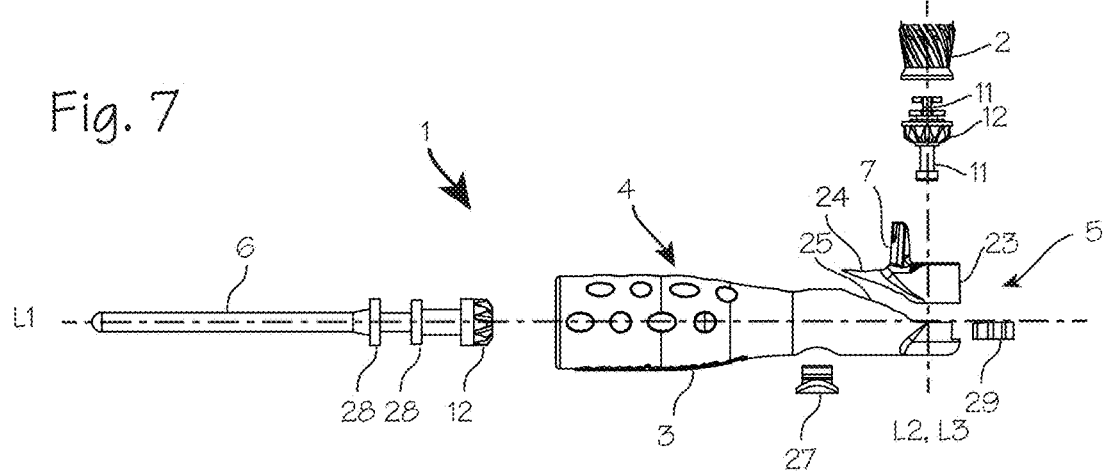
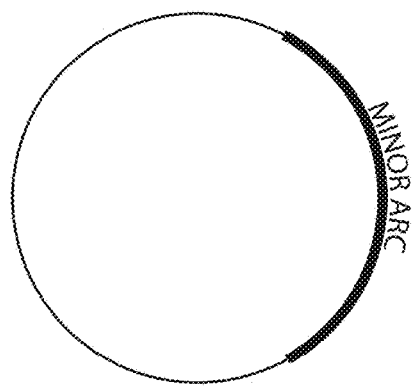

PROPHY ANGLE WITH SPLATTER GUARD

This application is a continuation of U.S. application Ser. No. 18/885,528, filed Sep. 13, 2024, which claims priority to U.S. Provisional Application 63/538,464 filed Sep. 14, 2023.

FIELD OF THE INVENTIONS

The inventions described below relate to the field of prophy angles.

BACKGROUND

Prophylaxis angles, or prophy angles, are devices used by dental hygienists to polish teeth along with polishing paste (prophylaxis paste). The prophy angle includes a cup for holding polishing paste, and a drive shaft for rotating the cup. The prophy angle is configured for attachment to a motorized handpiece, and the handpiece can be operated by the hygienist to rotate the cup, filled with paste, while the hygienist holds the cup against the teeth of a patient. The rotation of the cup in the patient's mouth generates a slurry of saliva, paste, and removed dental plaque and calculus, and may also result in splatter of this slurry. Many prophy angles with features designed to minimize splatter have been proposed, including wedges shown Kumar, U.S. Pat. No. 9,662,236 and Prange, U.S. Pat. No. D839,436 and a fully enclosing shield shown in Hall, U.S. Pat. No. 5,131,846.

SUMMARY

The prophy angles below provide for effective splatter reduction in a prophy angle while minimizing the size of the splatter guard and provide a less obstructive view of the teeth during use. The prophy angle includes the typical proximal housing and drive shaft, a gear arrangement with a prophy cup axle, and a distal housing for the prophy cup axle. The splatter guard comprises a wide, arcuate shield located near the prophy cup, spanning a minor arc about the prophy cup, and preferably limited to a minor arc.

BRIEF DESCRIPTION OF THE DRAWINGS

FIG. 5 demonstrates the configuration of the prophy cup.

FIG. 6 is a perspective view of the splatter guard assembly.

FIG. 7 is an exploded view of the prophy angle 1 of the previous figures.

FIG. 8 demonstrates language used to define the dimensions of the splatter guard.

DETAILED DESCRIPTION OF THE INVENTIONS

Figure 1:
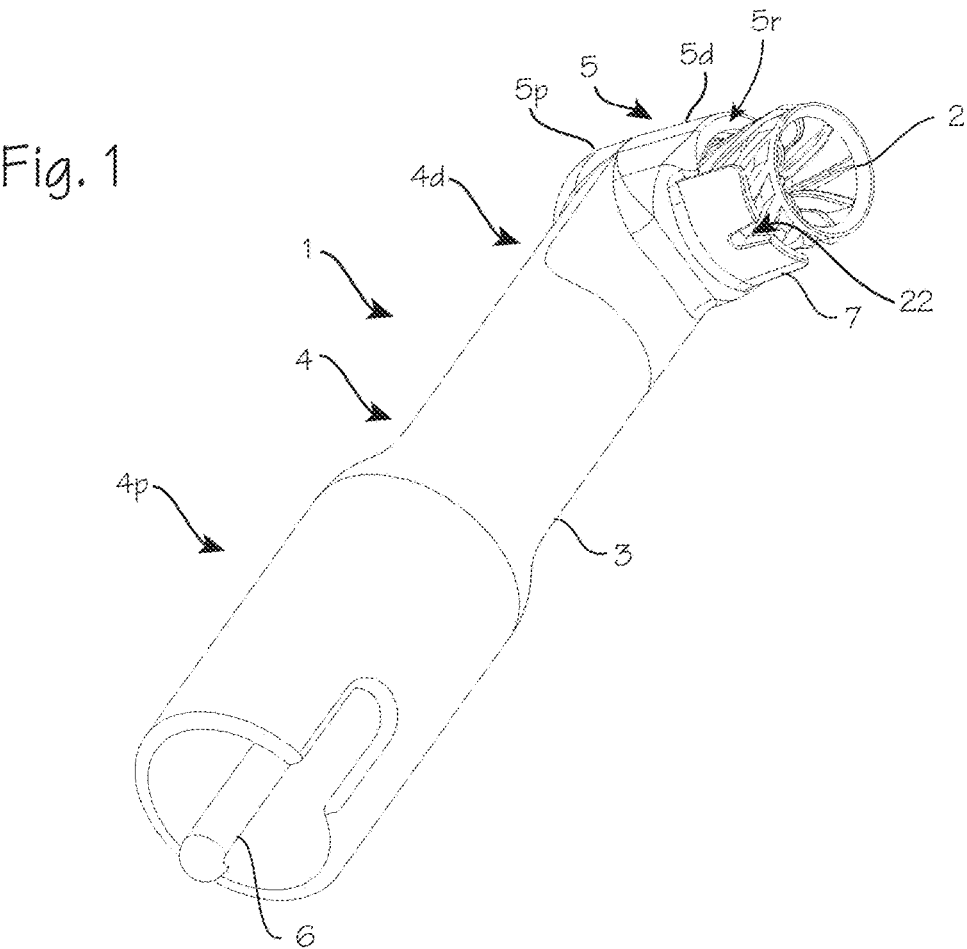
FIG. 1 is a perspective view of a prophy angle with a splatter guard.

FIG. 1 is a perspective view of a prophy angle with a splatter guard. The prophy angle 1 includes a rotatable prophy cup 2 at the distal end of a tubular housing 3. The tubular housing may be characterized by a first housing portion 4 which has a proximal end 4p configured for attachment to a motorized handpiece, and a second housing portion 5 disposed at the distal end 4d (furthest from the attachment to the motorized handpiece) of the first housing portion. The second housing portion 5 also has a proximal end 5p nearest its origin at the distal end 4d of the first housing portion 4 and a distal end 5d spaced from the proximal end on an axis offset at an angle from the long axis of the first housing portion 4. The second housing portion terminates, at its distal end, in a rim 5r. The second housing may be referred to as an axle housing. The prophy cup 2 is rotatably disposed within a bore of the second housing portion, or just outside the bore of the second housing portion/axle housing, and is operably connected to the drive shaft 6 which may be rotated at high speed by an associated motorized handpiece (not shown). A splatter guard 7 is disposed near the prophy cup, extending distally from the second housing portion toward the distal end of the prophy cup. 8910

Figure 2:
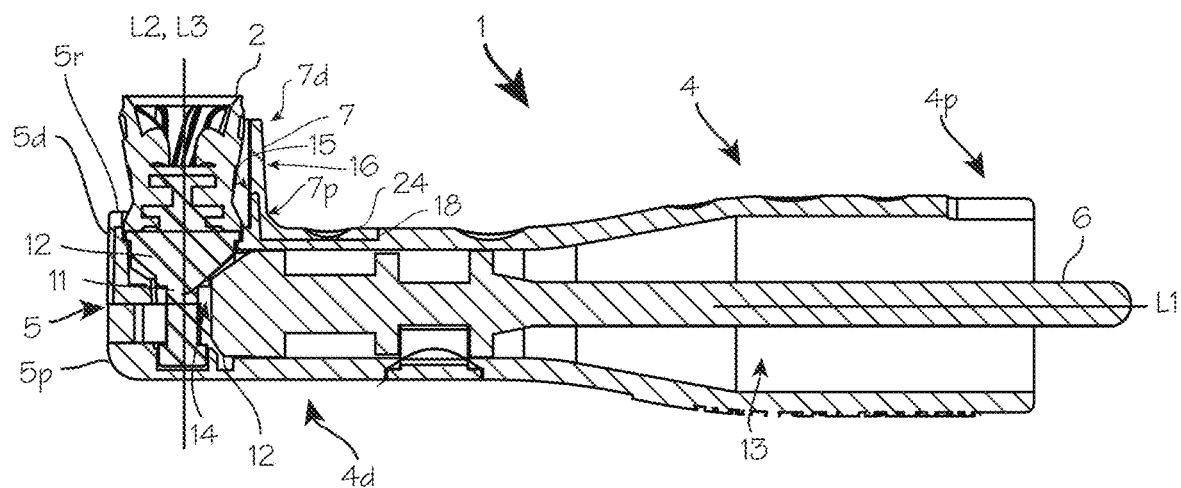
FIGS. 2 and 3 are cross-sections of the prophy angle of FIG. 1, with variations in the structure of the splatter guard.

FIG. 2 is a cross-section of the prophy angle of FIG. 1. In addition to the features of FIG. 1, FIG. 2 shows a prophy cup rotatably fixed to an axle or prophy cup shaft 11 and a gear arrangement comprising a pair of bevel gears 12 which operably connect the axle/prophy cup shaft 11 to the drive shaft 6. As appears from the cross-section, the drive shaft is disposed within a first bore 13 of the first housing portion. This first bore in the tubular housing 4 communicates with a second bore 14 in the axle housing, and the second bore of the axle housing is disposed at an angle to the first bore and the drive shaft. The first shaft 6 (the drive shaft) is rotatable about a first axis L1, to cause rotation of the prophy cup and second shaft (the prophy cup shaft or axle) about a second axis L2, which may be the long axis of the prophy cup and/or the second shaft. This is a convenient and inexpensive construction, but the two shafts may be replaced with a single flexible drive shaft. The proximal end of the drive shaft and the proximal end of the first housing portion 4 in the illustration are configured to mate with a Doriat-style handpiece, but may be configured for connection to an E-type handpiece or other handpiece configuration.

The splatter guard 7 comprises a partial cylinder extending from the tubular housing along the exterior of the prophy cup. The partial cylindrical portion is characterized by a cylinder axis parallel to the axis of the prophy cup, and the splatter guard is fixed to the tubular housing at a fixed end 7p and extends from the tubular housing and terminates in a free end 7d, said splatter guard characterized by a circumferential length and a longitudinal length. The circumferential length is the length along the outer cylindrical surface of the partial cylinder along a line of a plane intersecting the partial cylinder, where the plane is perpendicular to the long axis of the prophy cup and cylinder axis (comparable to the circumference of a complete cylinder). The longitudinal length is the length from the proximal end to the free end, along a line parallel to the axis of the cylinder. The splatter guard is preferably wide, extending about a substantial portion of the rim 5r, and wider than it is high, such that the circumferential length is longer than the longitudinal length (the length along the axis of the prophy cup and axle). In geometric terms, the inner surface of the splatter guard extends along a minor arc (less than 180°) of the circumference of the rim and/or prophy cup, depicted in FIG. 8. As shown in the Figures, the circumferential length covers a minor arc, and is limited to a minor arc, and does not cover a major arc (more than 180°). In other embodiments, the splatter guard may cover a major arc, but should not entirely surround the prophy cup (to allow for movement of slurry radially away from the cup after being blocked by the fender, rather than exiting primarily along the axis of the prophy cup). As shown, the splatter guard is disposed on a proximal side, relative to the first housing portion, of the rim, proximal to the prophy cup (between the prophy cup and the proximal end of the tubular housing), though the splatter guard may be disposed on the distal side or lateral sides of the prophy cup 2 or rim 5r. The outer surface may span an arc matching the arc of the inner surface, or it may span a lesser or greater arc.

As shown in FIG. 2, the partial cylindrical portion of the splatter guard has an inner cylinder surface 15 and an outer cylinder surface 16, and the inner cylinder surface in this illustration is parallel to the long axis of the prophy cup, such that the inner cylindrical surface of the splatter guard proximate the small diameter end of the truncated cone of the prophy cup is spaced a first distance from the small diameter end of the truncated cone of the prophy cup and the inner cylindrical surface of the splatter guard proximate the large diameter end of the truncated cone of the prophy cup is spaced a second distance from the large diameter end of the truncated cone of the prophy cup, said second distance being smaller than the first distance, such that the gap between the prophy cup and the splatter guard is not uniform along the length of the prophy cup. The inner cylinder surface of the splatter guard may be spaced from the outer surface of the prophy cup, such that the two surfaces do not touch absent deformation of the prophy cup during use (whether they touch during use depends on the manner of use), or the inner cylinder surface of the splatter guard may be spaced from the outer surface of the prophy cup, such that the two surfaces do not touch even after significant deformation of the prophy cup during use.

Figure 3:
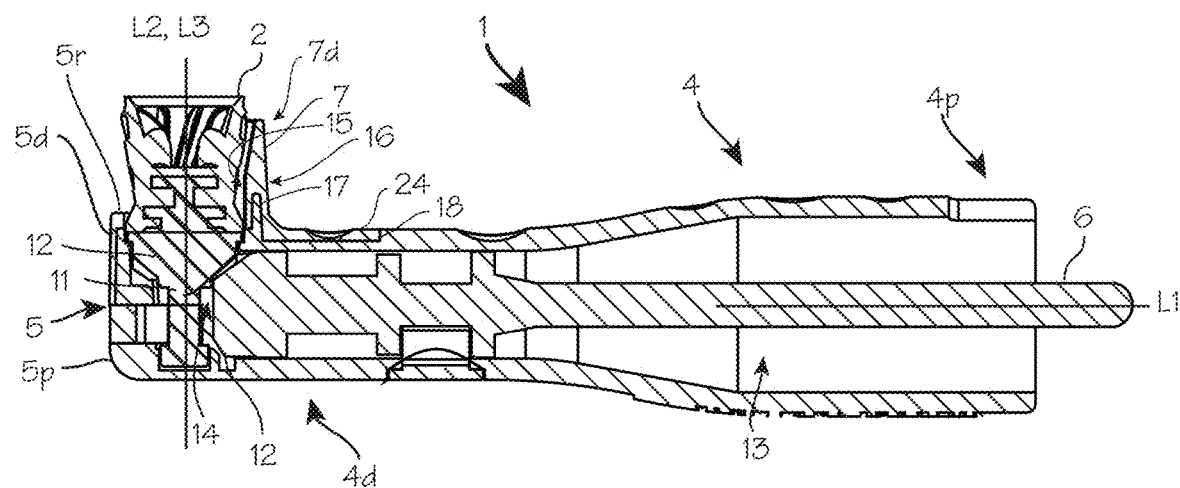

As shown in FIG. 3, the partial cylindrical portion of the splatter guard has an inner cylinder surface 15 and an outer cylinder surface 16, and the inner cylinder surface is parallel to the outer surface of the prophy cup, such that the inner cylindrical surface of the splatter guard proximate the small diameter end of the truncated cone of the prophy cup is spaced a first distance from the small diameter end of the truncated cone of the prophy cup and the inner cylindrical surface of the splatter guard proximate the large diameter end of the truncated cone of the prophy cup is spaced the same first distance from the large diameter end of the truncated cone of the prophy cup, such that the gap between the prophy cup and the splatter guard is uniform along the length of the prophy cup. The splatter guard 7 may be supported and secured to the tubular housing, as shown in both FIGS. 2 and 3, with a stay or support fin 17 arising from the distal end of the tubular housing 3 the first housing portion 4, along a line at an angle to the axis of the prophy cup (perpendicular in this case, or a greater angle in the case of a contra angle), fitted within a slot or recess in the splatter guard, or otherwise secured to the extension. The stay serves to stabilize the splatter guard, which may be made of a more flexible and pliant material than the housing, and also serves to securely attach, along with the proximal extension, the spatter guard assembly to the tubular housing. The distal end of the tubular housing can include a recess 18 which accepts the proximal extension (FIG. 6, item 24) of the splatter guard assembly.

Figure 4:
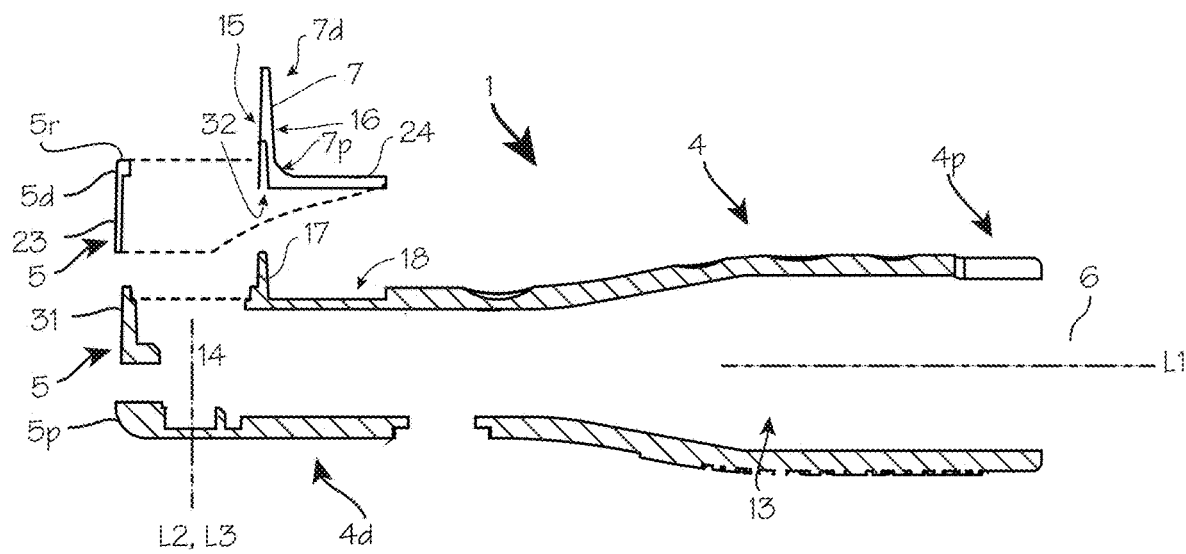
FIG. 4 is a cross-section of the device, illustrating the securement of the splatter guard to the housing portions, of FIG. 2.

FIG. 4 is a cross-section of the device, illustrating one manner of securement of the splatter guard to the housing portions of FIG. 2. In FIG. 4, the drive shaft 6, prophy cup axle 11 and prophy cup 2 have been omitted to more clearly illustrate the structure of the splatter guard securement to the remainder of the second housing portion 5 and the distal end of the first housing section 4. The second housing portion 5 is characterized by the second bore 14 which is disposed at an angle to the first bore (axis L2, L3 is at an angle to axis L1). A cylindrical portion 31 (at least, a partial cylinder) of the second housing establishes a portion of the second housing. A partial cylinder 17 extending distally (relative to the second housing, along L2, L3) establishes the support fin for the splatter guard 7. The splatter guard is disposed over the support fin 17 and cylindrical portion cylinder 31 of the second housing. The support fin may fit into a corresponding recess 32 in the support fin 17. The splatter guard may be formed separately from the housing, and thereafter fitted over the cylindrical portion 31 and support fin 32, but is preferably formed by over-molding the splatter guard onto the housing, such that the cylindrical portion 31 and support fin 17 and housing 4 are disposed in a mold with a cavity in the form of the splatter guard, and injecting material into the mold to cover the cylindrical portion 31 and support fin 32 to form the splatter guard around the cylindrical portion 31 and support fin 17. The proximal extension, which may not be necessary, may be formed in the same over-molding step.

FIG. 5 demonstrates a configuration of the prophy cup that may be used in the device, though many other variations may be used. The prophy cup has an exterior surface 19 and a prophy cup long axis L3, which in this case is coincident with the second axis L2. The prophy cup is rotationally fixed to the second shaft 11. The prophy cup has a base portion 20 and a cup or bowl portion 21, with the cup/bowl portion typically having a truncated conical shape, with a small diameter end 21p of the truncated cone proximate the base and a large diameter end 21d of the truncated cone displaced from the base. The small diameter end 21p may be elongated, configured as an isodiametric stem connecting the base portion to the bowl. A void within the base portion and/or stem is configured to receive an interlocking end component of the distal extent 11d axle/prophy cup shaft, to rotationally lock the prophy cup to the axle.

The splatter guard may be provided in a splatter guard assembly comprising a splatter guard base and splatter guard extending from the base. The splatter guard base may be disposed about the axle/prophy cup shaft 11 and may extend upward to surround a portion of the prophy cup base 20, with a bore characterized by a longitudinal axis and a transverse cross-section and an internal surface which is circular in the transverse cross-section. FIG. 6 is a perspective view of the splatter guard assembly 22. This assembly allows for attachment of the splatter guard proper to the tubular housing, and also allows for use of different material for the splatter guard and the tubular housing 3. The splatter guard assembly includes a base in the form of a cylindrical portion 23 that establishes a portion of the second housing portion/axle housing, and may also include a proximally extending (relative to the tubular housing) extension 24 configured to fit within the recess 18 in the distal end of the tubular housing (see FIG. 6, below). The proximal extension may extend proximally away from the cylindrical portion or splatter guard, or the join between the two. The rim 5r of the cylindrical portion of this assembly corresponds to rim 5r shown in FIGS. 2 and 3. The splatter guard 7 extends distally (relative to the origin on the rim), from the cylindrical portion 23. The splatter guard is configured as an arcuate wall or fender akin to a fender on a bicycle or a mudflap on a truck. The inventors use the term "fender" to denote this structure, because it conforms to the shape of a partial cylinder, is limited in circumferential extent to a minor arc around the circumference of the axle housing, and need not contact the prophy cup, and it connotes a distinction from the "sharp" blades or wedges disclosed in references such as Kumar, U.S. Pat. No. 9,662,236 and Prange, U.S. Pat. No.

D839,436 and distinct from the fully enclosing shield of Hall, U.S. Pat. No. 5,131,846. The splatter guard has a broad internal surface 15 which apposes the outer surface of the prophy cup. The splatter guard may be notched, with one or two notches in the distal end, resulting in two or more broad teeth 25. The notches are shown as item 26 in the distal end of the splatter guard in FIG. 1 and FIG. 5. The notches, or gap between the broad teeth 25, are preferably 1 to 2.5 mm wide. The splatter guard assembly may be made of any suitable material, though an elastomeric polymer is preferred.

The splatter guard may be provided on an assembly made separate from the tubular housing allowing for easy assembly of the prophy angle or the splatter guard assembly may be over-molded onto the housing. FIG. 7 is an exploded view of the prophy angle 1 of the previous figures, showing the prophy cup 2, tubular housing 3 and first housing portion 4, the second housing portion/axle housing 5, second housing portion/axle housing 5, and the drive shaft 6 and axle/prophy cup shaft 11 and the bevel gears of each, along with thrust bearing 27 which is insertable through a port in the tubular housing to be positioned between drive shaft flanges 28 and thrust bearing 29 which is insertable into a port in the second housing portion to provide support to the axle/prophy cup shaft 11 (both bearings may act as thrust bearings if disposed proximate a flange on the shafts, or, in the case of the axle/prophy cup shaft 11, the proximal surface of the bevel gear in the axle/prophy cup shaft 11, and both bearings may act as journal bearings).

The splatter guard itself may extend distally from the cylindrical splatter guard base, and have an inner surface positioned in apposition to the prophy cup, spaced from the prophy cup, with, preferably, the entirety of the inner surface being straight along a longitudinally extending line which lies in a plane in which the axis of the prophy cup lies, with the inner surface being parallel to the axis of the prophy cup, such that the splatter guard inner surface is spaced a first distance from the outer surface of the prophy cup near the prophy cup base, and spaced a second, lesser distance from the outer surface of the prophy cup at a position distal to the prophy cup base.

The splatter guard itself may extend distally from the cylindrical splatter guard base, and have an inner surface positioned in apposition to the prophy cup, with the inner surface spaced from the prophy cup, with, preferably, the entirety of the inner surface being straight along a longitudinally extending line which lies in a plane in which the axis of the prophy cup lies, with the surface inclined relative to the axis of the prophy cup, such that the splatter guard inner surface is spaced a first distance from the axis of the prophy cup near the prophy cup base, and spaced a second, further distance from the axis of the prophy cup at a position distal to the prophy cup base. Thus, the inner surface of the fender may conform to the surface of a straight or conic cylinder.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A prophy angle comprising:
a tubular housing having a proximal end configured for attachment to a handpiece and a distal end, with a prophy cup (2) disposed proximate the distal end of the tubular housing;
a splatter guard disposed at the distal end of the tubular housing and proximate the prophy cup, said splatter guard comprising a partial cylinder with an inner wall proximate the prophy cup, said inner wall conforming to the shape of a cylinder, said inner wall having a circumferential length that is limited to a minor arc, wherein
the splatter guard is disposed on the tubular housing at a location between the prophy cup and the proximal end of the tubular housing.

2. The prophy angle of claim 1, further comprising:
a splatter guard assembly comprising a cylindrical portion and a proximally extending extension configured to fit within a recess in the distal end of the housing, wherein the splatter guard extends from a rim of the cylindrical portion, wherein:
the splatter guard assembly is disposed on the distal end of a housing such that the partial cylinder of the splatter guard surrounds a portion of the axle or prophy cup and the proximally extending extension is disposed within the recess in the distal end of the housing.

3. The prophy angle of claim 1, further comprising:
a support fin extending from the tubular housing, said support fin secured within the splatter guard and comprising a partial cylinder extending distally from the tubular housing.

4. The prophy angle of claim 1 wherein:
the splatter guard is fixed to the tubular housing at a fixed end of the splatter guard and extends along the prophy cup and terminates in a free end of the splatter guard, and the splatter guard has at least one notch in the free end, extending through the splatter guard from an inner surface of the splatter guard to an outer surface of the splatter guard.

5. A prophy angle comprising:
a housing having a proximal end configured for attachment to a hand piece, said housing having a first housing portion having first bore aligned with a longitudinal axis of the first housing portion, said housing having a second housing portion with a second bore, communicating with the first bore, said second housing portion disposed at a distal end of the housing and having a second bore axis disposed at an angle from the first bore and the longitudinal axis of the first housing portion;
a first shaft disposed within the first bore, said first shaft being rotatable about the longitudinal axis;
a second shaft disposed within the second bore, said second shaft operably connected to the first shaft and rotatable in response to rotation of the first shaft and rotatable within the second housing portion and second bore about the second bore axis;
a prophy cup coupled to the second shaft, said prophy cup having an exterior surface and a prophy cup long axis, said prophy cup being rotationally fixed to the second shaft, said prophy cup having a base portion and a cup portion, said cup portion comprising a truncated cone, with a small diameter end of the truncated cone proximate the base and a large diameter end of the truncated cone displaced from the base, said cone having an axis aligned with the second shaft;

a splatter guard extending from the housing along the exterior of the prophy cup, said splatter guard comprising a partial cylindrical portion characterized by a cylinder axis parallel or coincident to the axis of the prophy cup, said splatter guard fixed to the housing at a fixed end and extending from the housing and terminating in a free end, said splatter guard characterized by a circumferential length and a longitudinal length, wherein the circumferential length is longer than the longitudinal length; wherein the splatter guard is disposed on the housing at a location between the prophy cup and the proximal end of the housing.

6. The prophy angle of claim 5 wherein the splatter guard has an inner cylindrical surface and an outer cylindrical surface, and the inner cylindrical surface is parallel to the long axis of the prophy cup, such that the inner cylindrical surface of the splatter guard proximate the small diameter end of the truncated cone of the prophy cup is spaced a first distance from the small diameter end of the truncated cone of the prophy cup; and the inner cylindrical surface of the protrusion proximate large diameter end of the truncated cone of the prophy cup is spaced a second distance from the large diameter end of the truncated cone of the prophy cup, said second distance being smaller than the first distance.

7. The prophy angle of claim 5 wherein the circumferential length of the partial cylindrical portion is limited to a minor arc.

8. The prophy angle of claim 5 wherein the circumferential length of the partial cylindrical portion comprises a major arc but does not entirely surround the prophy cup.

9. The prophy angle of claim 5, wherein the splatter guard is disposed on the second housing portion at a location between the prophy cup and the first housing portion.

10. The prophy angle of claim 5 wherein:

the splatter guard is fixed to the housing at a fixed end of the splatter guard and extends along the prophy cup and terminates in a free end of the splatter guard, and the splatter guard has at least one notch in the free end, extending through the splatter guard from an inner surface of the splatter guard to an outer surface of the splatter guard.

* * * * *